United States Patent [19]
Feintuch et al.

[11] Patent Number: 5,130,952
[45] Date of Patent: Jul. 14, 1992

[54] BROADBAND ADAPTIVE DOPPLER ESTIMATOR AND CANCELLER

[75] Inventors: Paul L. Feintuch, Covina, Calif.; William E. Alexander, New Haven, Conn.

[73] Assignee: Hughes Aircraft Company, Los Angeles, Calif.

[21] Appl. No.: 588,645

[22] Filed: Sep. 26, 1990

[51] Int. Cl.$^5$ .............................................. G01S 15/00
[52] U.S. Cl. ........................................ 367/135; 367/904
[58] Field of Search ........................... 367/135, 904; 364/724.1

[56] References Cited
PUBLICATIONS

"An Efficient Procedure for Broadband Doppler Compensation", Proceedings of the 1984 IEEE International Conference on Acoustics, Speech and Signal Processing, pp. 47.9.1–47.9.4, Ronald A. Mucci.

Primary Examiner—Daniel T. Pihulic
Attorney, Agent, or Firm—Wanda K. Denson-Low

[57] ABSTRACT

A broadband adaptive Doppler estimator and canceller is described for adaptively removing a moving source of near field primary interference that is masking a weaker target. The estimator and canceller employs a distributed field of sensors, through which is moving the source of interference. The estimator and canceller takes the form of a canceller system, wherein the measured reference waveform is a Doppler shifted version of the interference. The estimator and canceller employ interpolating and decimating of the reference waveform to remove Doppler effects over a broadband. The interpolation is performed by oversampling (zero padding) and low pass filtering, and the decimation is a sample rate reduction. The adaption is performed in the decimation to minimize mean square error in the canceller output.

28 Claims, 6 Drawing Sheets

BROADBAND ADAPTIVE DOPPLER ESTIMATOR AND CANCELLER

BACKGROUND OF THE INVENTION

The invention relates to a technique for adaptively removing a source of interference from a primary waveform that is masking a weaker waveform, and more particularly to a method for estimating the Doppler shift of interference moving through a field of separated sensors and adaptively cancelling the interference.

The broadband removal of unknown and time varying Doppler effects is motivated by the following problem. Consider a sparse field of distributed sensors $S_1$ and $S_2$ through which moves a strong source of interference, I, as illustrated in FIG. 1. Each sensor node $S_1$ and $S_2$ in the distributed field will sense the interference with a different Doppler shift due to the motion internal to the field. A target of interest is much weaker than the interference, and is detectable only by the node to which it is closest. Since the interference I is detected on both nodes $S_1$ and $S_2$ and the target T appears on only one node, a natural approach is to use other nodes as reference waveforms for the adaptive cancellation of the strong interference from the node detecting the weak target. The Doppler shifts tend to decorrelate the interferences, however, significantly degrading the performance of a conventional multiple LMS adaptive canceller.

The need, therefore, exists to adjust to the Doppler effects on spatially separated coherent components so that other nodes can be used to remove the interference energy that masks the weak signals of interest.

The conventional approach in adaptive cancellation is to use a reference measurement that is highly correlated with a component of a primary waveform that one wants to remove. That component can be strong jamming, for example, that masks a weak signal on the primary waveform The reference is usually input to the LMS adaptive filter, and the output is subtracted from the primary waveform. The resulting cancelled output, called the error waveform, is fed back to drive the adaptive filter to minimize the power in the error. The problem is that the Doppler shifts on the interference waveform between the reference and the primary decorrelate the broadband interference between the two. This severely degrades the ability of the canceller to suppress the interference. Thus, some method is needed to undo the Doppler effects, which are unfortunately unknown. The adaptive Doppler canceller of the present invention compensates for the Doppler effects and simultaneously estimates the Doppler parameter and cancels the interference.

It is known that digital Doppler "unstretching" can be used to induce (or to undo) a known Doppler shift on a broadband waveform. R. A. Mucci, "An Efficient Procedure for Broadband Doppler Compensation," Proceedings of the 1984 IEEE International Conference on Acoustics, Speech and Signal Processing," pages 47.9.–47.9.4.

Let s(t) denote the radiated signal. The medium is assumed to introduce attenuation and delay due to propagation over range R, additive noise, and no signal distortion. The received signal y(t) is then given by $$y(t) = \alpha(R)s(t - R/c) + n(t) \qquad (1)$$

where $\alpha(R)$ is the attenuation factor and c is the sound speed. If there is a relative velocity, V, between the radiator and the receiver, then $$R = R_o + Vt \qquad (2)$$

where $R_o$ is the range at time zero, and the received waveform is then $$y(t) = \alpha(R)s[(1-a)t - \tau] + n(t) \qquad (3)$$

where $a = V/c$ and $\tau = R_o/c$.

The approach by Mucci. i.d., for removing Doppler effects is to interpolate and then decimate by different factors. The transmitted waveform is x(t), and the signal component of the received waveform is $y(t) = x[(1-a)t]$. The waveform is sampled at a high rate $1/T$, i.e., at an interval of T seconds, so that the sampled waveform, denoted by $y_T(n)$ is given by $$Y_T(n) = y(nT) = x[(1-a)nT] \qquad (4)$$

The next step it to interpolate by an integer factor, L, forming an estimate of the radiated signal.

$$\hat{Y}_{T/L}(n) \approx x[(1-a)nT/L] \qquad (5)$$

This is followed by decimation by an integer factor, K, producing a sequence of estimates of x(t) at uniformly spaced times spaced $(1-a)KT/L$.

$$\hat{Y}_{TK/L}(n) \approx x[(1-a)KnT/L] \qquad (6)$$

Note that if K and L are chosen such that $(1-a)K/L = 1$, then the sequence in eq. 6 provides estimates of the original waveform x(t) uniformly spaced T seconds apart in time, i.e., the Doppler shift is removed.

Mucci suggests the following implementation: 1) zero pad and low pass filter for the interpolation, and then 2) reduce the sample rate by K, i.e., take every $K^{th}$ sample Such an implementation does not take into account the effects of time varying, unknown Doppler shifts.

SUMMARY OF THE INVENTION

A method and apparatus is described for adaptively cancelling from a primary waveform a near field source of interference that is masking a weaker target of interest wherein the interference source is moving in a medium between first and second spatially separated sensors which provide respective first and second observations signals. The method includes the steps of sampling the first and second signal waveforms at a rate $1/T$ to provide successive samples of the first and second observation signals.

The sampled first and second observation signals are interpolated by an interpolation function which zero fills the samples by an integer factor L and then low pass filters the samples to create the effect of a higher sampling rate $(1/LT)$ on the observation signals.

The interpolated samples of the second observation signal are then decimated by an integer factor K to produce a sequence of samples at uniformly spaced times, the spacing at $(1-V/c)KT/L$, where V is the relative velocity between the interference source and the first sensor and c is the speed of sound in the medium.

The interpolated, decimated sampled second sensor signal is then subtracted from the interpolated samples of the first observation signal to provide an error signal.

In accordance with the invention, the method further includes the step of adaptively varying the decimation factor K to minimize the power in the error signal. The relative Doppler shift of the respective observed signals can be determined from the value of K which results in the minimization of the power in the error signal.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENTS

Overview of the Invention

The purpose of the invention is to cancel the Doppler shifted interference received by a distributed field of sensors from a near-field moving source of strong interference which is interior to the sensor field. Far field interference can be cancelled using conventional cancellation techniques, since the far field interference will be essentially the same at both spatially separated sensors. However, the near field interference (interior to the field of sensors) is Doppler shifted from one sensor to the other, and hence the signal from one sensor is not usable as a reference in a conventional canceller.

In accordance with the invention, the signals from the separated sensors are processed by an adaptive canceller to estimate the Doppler shift on the interference and adaptively remove its effects, thereby permitting the interference to be cancelled and to permit the system to detect weak targets.

Figure 1:
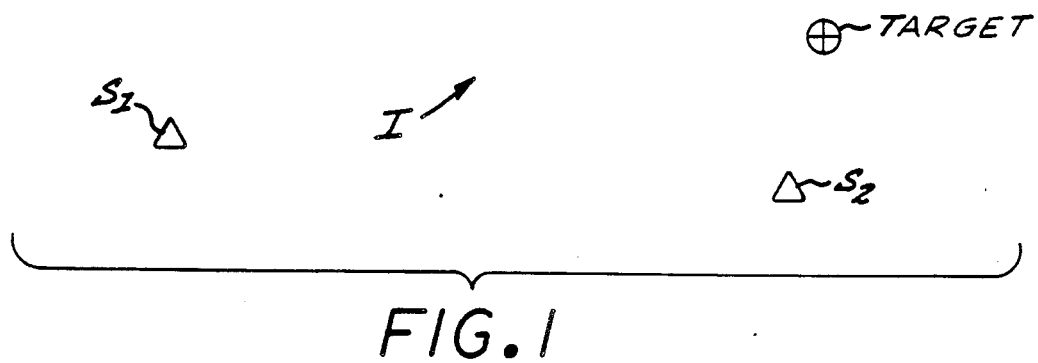
FIG. 1 is a schematic view of a field of distributed sensors through which a strong interference source I moves and masks a weak target.
Figure 2A:
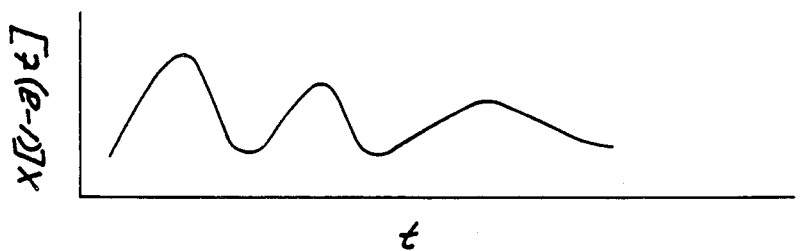
FIGS. 2A-2D are exemplary waveforms illustrative of the interpolation and decimation processes employed in a canceller embodying the invention.
Figure 2B:
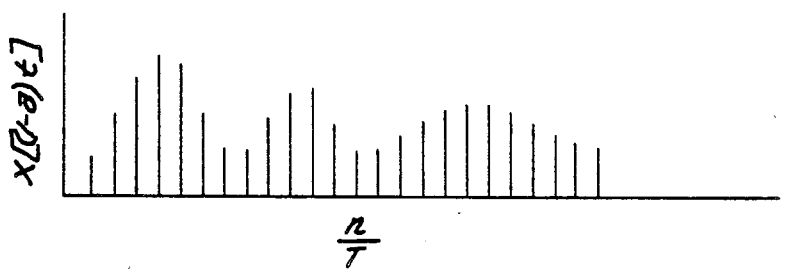
Figure 2C:
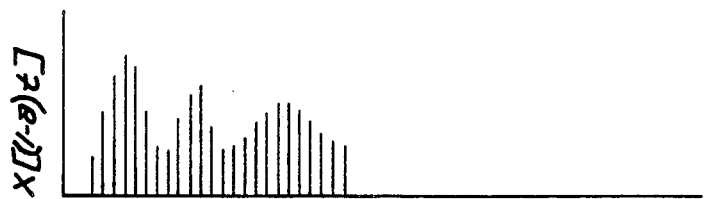

The distributed sensor field is illustrated in FIG. 1. An illustrative waveform observed at one sensor and including the Doppler shifted interference is shown in FIG. 2A. The observed waveform is sampled at a sample rate T, as illustrated in FIG. 2B. The resulting samples are then interpolated at an integer interpolation factor L to create the effect of a faster sample rate 1/LT, i.e., a smaller T. In this process, illustrated in FIG. 2C, the time intervals intermediate respective samples of the actual observed waveform are "filled" with L interpolated sample values to create the effect of additional samples and hence the faster sample rate.

Figure 2D:
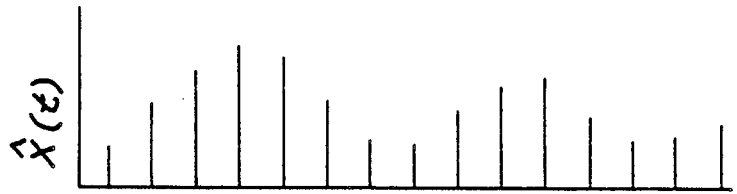

After interpolation, the resulting waveform is decimated in accordance with a decimation factor K, i.e., every $K^{th}$ interior sample is selected as representative of the waveform, as illustrated in FIG. 2D, and the remaining, non-selected samples are discarded. As shown by Mucci, id., if the decimation factor is properly selected, the Doppler shift will be removed from the decimated waveform. In accordance with the invention, the decimation parameter K is adaptively varied until the proper value is determined which minimizes the mean square error or power out of the canceller. This value will determine the estimate of the Doppler shift of the interference waveform.

Details of An Exemplary Canceller Implementation

Figure 3:
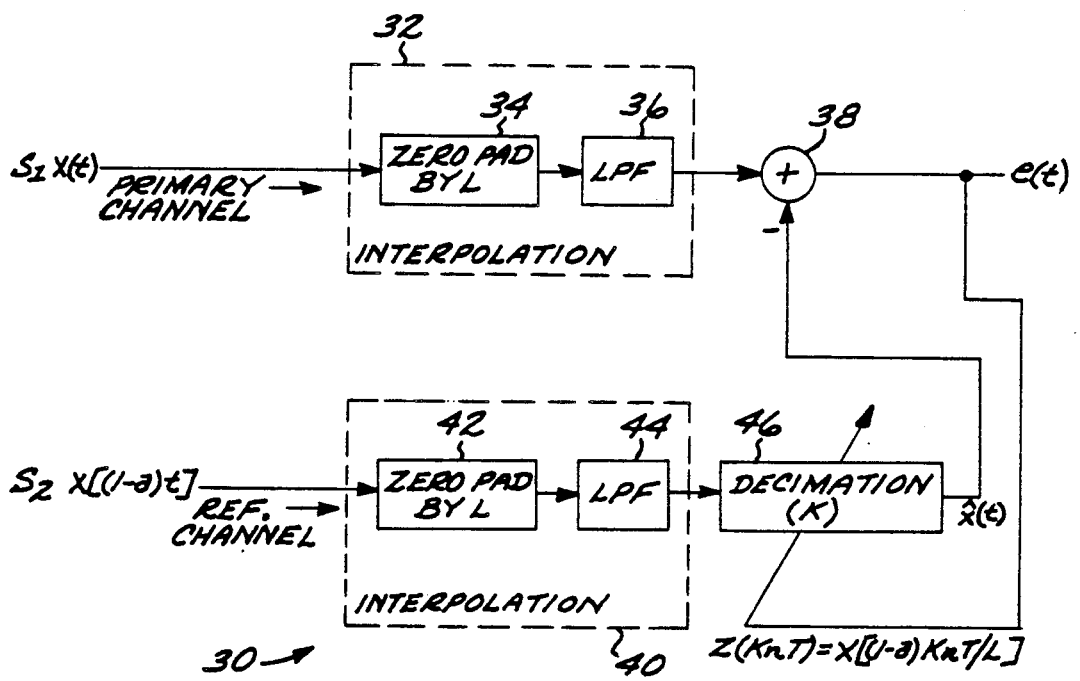
FIG. 3 is a simplified schematic diagram illustrative of an adaptive estimator and canceller in accordance with the invention.

The Doppler compensation components can be configured as an adaptive canceller 30 as in FIG. 3. The canceller 30 receives as inputs the signals observed at the respective sensors $S_1$ and $S_2$ (FIG. 1), wherein the $S_1$ observation is denoted x(t) and the $S_2$ observation is denoted x[1−a]t], where a represents the Doppler shift on near field interference. Both observed signals are digitized with a sample period T.

The observed signal x[(1−a)t] from sensor $S_2$ is fed to the interpolation function 40 which provides estimates of intermediate samples, with a factor L number of samples in between each original sample in the sampled waveform This is performed by zero padding (function 42) the original sampled waveform, i.e., placing values of zero at the L intermediate locations, and then passing the zero padded waveform through a digital low pass filter 44 which smoothes the waveform, producing values at the intermediate time points.

The sampled signal x(t) from the first sensor $S_1$ is also subjected to an interpolation function 32 identical to the interpolation function 42 in the reference channel. Thus, the interpolation function 32 in this embodiment comprises a zero pad function 34 and low pass filter function 36. The interpolation function 32 acts as a sample rate converter as described below. The interpolated samples are fed to the summing node 38.

The interpolated, filtered waveform samples of the observed signal from sensor $S_2$ are adaptively decimated at function 38 by a decimation factor K which is adaptively selected by an iterative technique described below. The resultant waveform samples represent an estimate of the observed waveform x(t). The inverse of the estimate is summed at summary node 38 with the interpolated samples of the observed waveform x(t) and the resultant sum e(t) represents the error signal of the canceller.

A sampling rate converter or interpolation function like that of the reference channel is also placed on the primary channel, as discussed above. This converter 32 (which interpolates without decimating) produces the same sample rate on the reference and primary channels so that samples are available to be subtracted at function 38. At whatever value of K (the decimation factor) at which the reference channel is sub-sampled, there will always be a sample available on the primary channel for subtraction. Thus, if the Doppler-shifted waveform at sensor $S_2$ has sampled values of x[(1−a)KnT/L] at the nth time sampled, the primary channel, $S_1$, will have values x[nT/L] at the same time interval. The adaptive Doppler filter 30 adjusts K so that the appropriate sample is selected on the reference channel to best estimate the amplitude value of the waveform $S_1$ at time n on the primary channel.

The zero padding and interpolation factor, L, will be selected to be very large for a particular application, so that only the decimation parameter, K, has to be adjusted to estimate the Doppler shift.

A gradient search technique minimizing the mean square error, i.e., the power in e(t), is employed in accordance with the invention. The error waveform when sampled as a sequence is $$e(n) = x(nT) - Z(KnT) = x(nT) - x[(1-a)KnT/L] \qquad (7)$$

To make the estimate of the value of K adaptive, it is first made time varying. The value of the estimate of K at the next time sample will be obtained by updating the previous estimate of K with a scaled estimate of the gradient of the mean squared error.

$$K(n+1) = K(n) - \mu(1/n)\nabla_{nK(n)}\{E[e^2(n)]\} \qquad (8)$$

where $\mu$ = the step size scaling in the gradient search procedure, and $\nabla_{nK(n)}$ = the gradient of nK(n).

The mean squared error is not available, so just like in LMS adaptation the instantaneous squared error is used in its place, with the iterative algorithm implicitly performing the time averaging that would approximate the expectation of the squared error. Thus, $$\nabla_{nK(n)}\{E[e^2(n)]\} \approx \nabla_{nK(n)}\{e^2(n)\} = 2e(n)\frac{\partial e(n)}{\partial nK(n)} \qquad (9)$$

The derivative of e(n) with respect to nK(n) is not available. It is possible to use the approach described in "Adaptive Estimation of Time Delays in Sampled Data Systems," IEEE Transactions on Acoustics, Speech and Signal Processing," D. E. Etter and S. D. Sterus, Vol. ASSP-29, No. 3, pages 582–587, June 1981, to approximate this derivative by a symmetric difference, as follows:

$$\frac{\partial e(n)}{\partial (nK(n))} = \frac{\partial\{x(nT) - x[(1-a)(K(n)/L)nT]\}}{\partial(nK(n))} \qquad (10)$$

$$= -\frac{\partial x[(1-a)(K(n)/L)nT]}{\partial(nK(n))}$$

$$= \lim_{\epsilon \to 0}\frac{x[(1-a)(T/L)(nK(n)-\epsilon)] - x[(1-a)(T/L)(nK(n)+\epsilon)]}{2\epsilon} \qquad (11)$$

Letting $\epsilon = L$ (i.e., the difference extends over the interval equal to twice the input sampling period) yields $$\frac{\partial e(n)}{\partial(nK(n))} \approx (1/2L)\{x[(1-a)(T/L)(nK(n)-L] - x[(1-a)(T/L)(nK(n)+L)]\} \qquad (12)$$

$$= (1/2L)\{Z[(nK(n)-L)T] - Z[(nK(n)+L)T]\} \qquad (13)$$

where $$Z[nK(n)T] = x[(1-a)(T/L)nK(n)]$$

is the output of the decimation function 38 in FIG. 3. Therefore, the gradient is approximated by $$\nabla_{nK(n)}\{E[e^2(n)]\} \approx 2e(n)\, \partial e(n)/\partial(nK(n)) \qquad (14)$$

$$= (1/L)\{x(nT) - Z(nK(n)T)\}\{Z[(nK(n)-L)t] - Z[(nK(n)+L)T]\} \qquad (15)$$

Using this estimate gradient in the update equation (eq. 8), for K(n), results in the adaptive filter equation for the decimation parameter.

$$K(n+1) = K(n) + \mu(1/n)(2/L)\{x(nT) - Z[nK(n)T]\}\{Z[nK(n)+L)T] - Z[(nK(n)-L)t]\} \qquad (16)$$

The value for K resulting in power minimization, $K_{PMIN}$, can be used to estimate the relative Doppler shift a, $a = 1 - L/K_{PMIN}$, and the relative velocity of the interference source, $V_{est} = (1 - L/K_{PMIN})c$.

It will be appreciated that the processing after sampling the two observation waveforms will typically be carried out by a digital computer programmed to implement the interpolation, filtering, decimation and summing functions illustrated in FIG. 3 and described above.

In steady state, assuming that the algorithm converges, the mean value of K(n+1) must equal the mean of K(n), i.e., steady state implies that the value is no longer changing with time. Thus, the update term on the average must go to zero. By examining the conditions for the mean value of the bracketed terms in equation 11 to be zero, the value to which K(n) converges can be obtained This will be done here in the absence of additive noise, to provide an indication of the deterministic behavior of the recursion. Note that the second bracket is in general not zero, since there is no reason why the values at the filter output at a symmetric time difference about the sample should be equal. The first bracket must then go to zero if the algorithm has converged. This will be achieved when $$x(nT) = z[K(n)nT] = x[(1-a)K(n)nT/L] \qquad (17)$$

from equation 7. Thus, the algorithm forces the quantity $(1-a)K(n)/L$ to unity, thereby removing the Doppler effects To show that the algorithm does indeed converge, assume that the inputs to the references and primary channels are identical except for Doppler shift so that $Z(nK(n)T) = x[(1-a)nK(n)T/L]$ (i.e., ignoring noise). Then the update equation can be written as $$K(n+1) = K(n) + (\mu/nL)(A)(B), \qquad (18)$$

where $A = x(nT) - x((1-a)nK(n)T/L)$ and $$B = x(1-a)(nK(n)+L)T/L) - x((1-a)(nK(n)-L)T/L).$$

The conditional expected value is taken of both sides of the equation, $$E[K(n-1)|K(n)] = K(n) + \mu(1/nL)\{R_x[C] - R_x[d]\} \qquad (19)$$

where
$C = (nT - (1-a)(nK(n)+L)T/L)$,
$D = (nT - (1-a)(nK(N) - L)T/L)$, and
$R_x$ = the correlation function of the process x(t).

Using the first term of a Taylor series expansion as an approximation $$R_x(\lambda + \epsilon) \approx R_x(\lambda) + \epsilon R'_x(\lambda)$$

eq. 20 is obtained, where $R'_x$ represents the derivative of $R_x$.

$$E[K(n+1)|K(n)] = K(n) - \mu(2T(1-a)/nL)R'_x[F] \qquad (20)$$

where $F = (nT - (1-a)nK(n)T/L)$.

To proceed further, a form is assumed for the autocorrelation function of the broadband input process. If the process has bandwidth equal to b, and an exponential correlation function, then its derivative is approximated by $R'_x(\lambda) \approx -b^2\lambda$. Then the conditional expectation of the adaptive parameter becomes $$E[K(N+1)K(n)] = K(n) + \mu(2b^2T(1-a)/nL)[F] \quad (21)$$

Averaging over K(n) yields $$\begin{aligned}E[K(N+1)] &= E[K(n)][1-\beta] + \beta L/(1-a) \\ &= E[K(1)][1-\beta]^n + \\ &\quad \beta L/(1-a)[1+(1-\beta)+\ldots+(1-\beta)^{n-1}] \\ &= E[K(1)][1-\beta]^n + L/(1-a)[1+(1-\beta)^n] \\ \text{where } \beta &= \mu 2b^2[(1-a)T/L]^2.\end{aligned} \quad (22)$$

Therefore if $0 \leq \beta \leq 1$, then $$\begin{aligned}\lim_{n \to \infty} E[K(n)] &= L/(1-a) \text{ so that} \\ Z(nK(n)T) &= x[(1-a)nK(n)T/L] \to x(nT)\end{aligned} \quad (23)$$

Thus, the mean value of the adaptive parameter converges, and converges to the correct Doppler value.

The time it takes for the algorithm to converge to within $K_e$ of its proper value can be inferred from the exponential term in the mean weight expression which can be rewritten as follows:

$$E[(n+1)] = L/(1-a) + [1-\beta]^n\{E[K(1)] - L/(1-a)\} \quad (24)$$

To determine the value of n required to be within $K_e$ of the proper value of K, the second term must be set equal to $K_e$:

$$K_e = [1-\beta]^n\{E[K(1)] - L/(1-a)\} \quad (25)$$

or $$n = [\log\{K\} - \log\{E[K(1)] - L/(1-a)\}]/(\log(1-\beta)) \quad (26)$$

Simulation Performance Examples

Four simulation examples are presented to demonstrate the performance of the adaptive Doppler filter. In all cases the canceller is configured with the input to the adaptive Doppler filter being the reference (unshifted) version of the signal in noise, with signal-to-noise ratio of 40 dB in all cases. The other waveform input, called the primary, is the Doppler shifted signal also in independent noise. The adaptive Doppler filtered reference waveform is subtracted from the primary waveform to produce an error waveform The converged result should minimize the power in the error. The lowest the power can be reduced is to the uncorrelated noise floor, which in this case is at −40 dB.

Note that the adaptive Doppler filter can only produce integer values of K, which only approximates the true value of L/(1−a). This filter responds to this by cycling proportionally between the two closest integer values. If this error is significant, then the value of L (the oversampling rate) would have to be increased.

Figure 4:
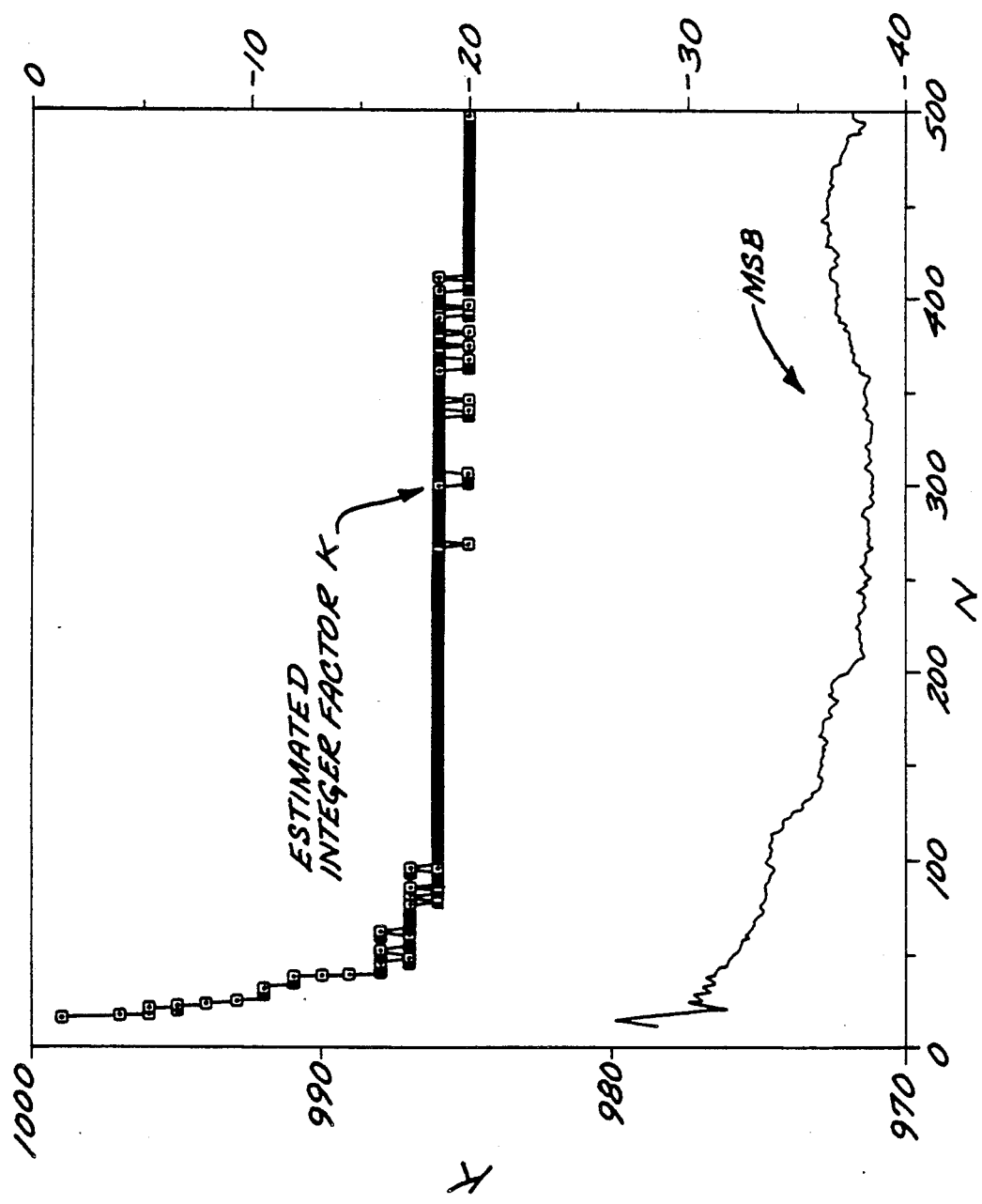
FIGS. 4-7 illustrate the results of specific examples of adaptive cancellation in accordance with the invention.

Example is a narrowband signal case, with three tones in a 0–100 Hz band, each experiencing the same Doppler shift parameter. Thus, each has a different Doppler shift in Hz. The value of L is 1000, and the optimal value of K for this Doppler shift is 985.2. Both the value of K and the resulting power in the error waveform (the mean square error, MSE) are shown in FIG. 4. As is evident from FIG. 4 the integer value of K closest to 985.2 is quickly achieved, and the MSE is reduced to near the noise floor value of −40 dB.

Figure 5:
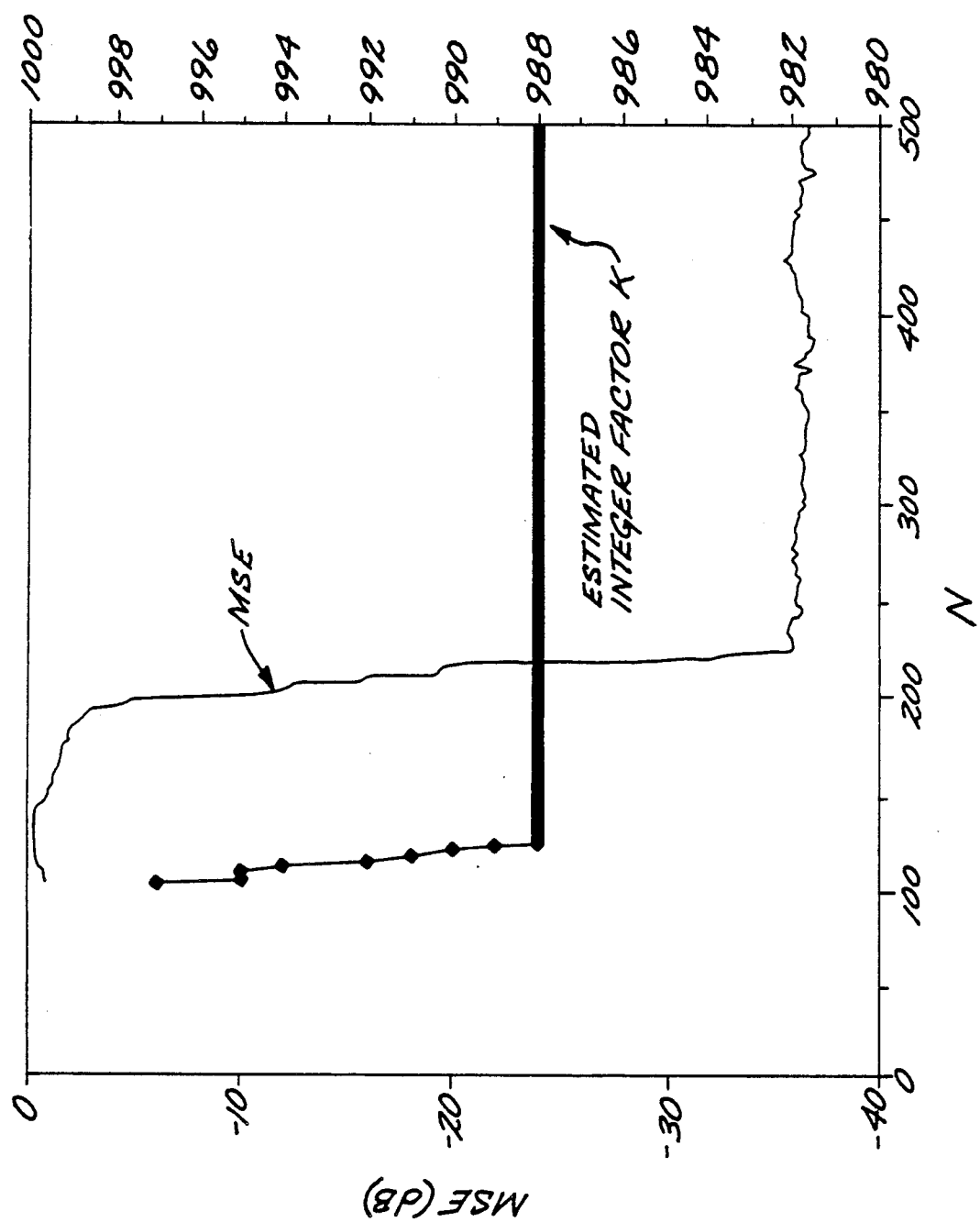
Figure 6:
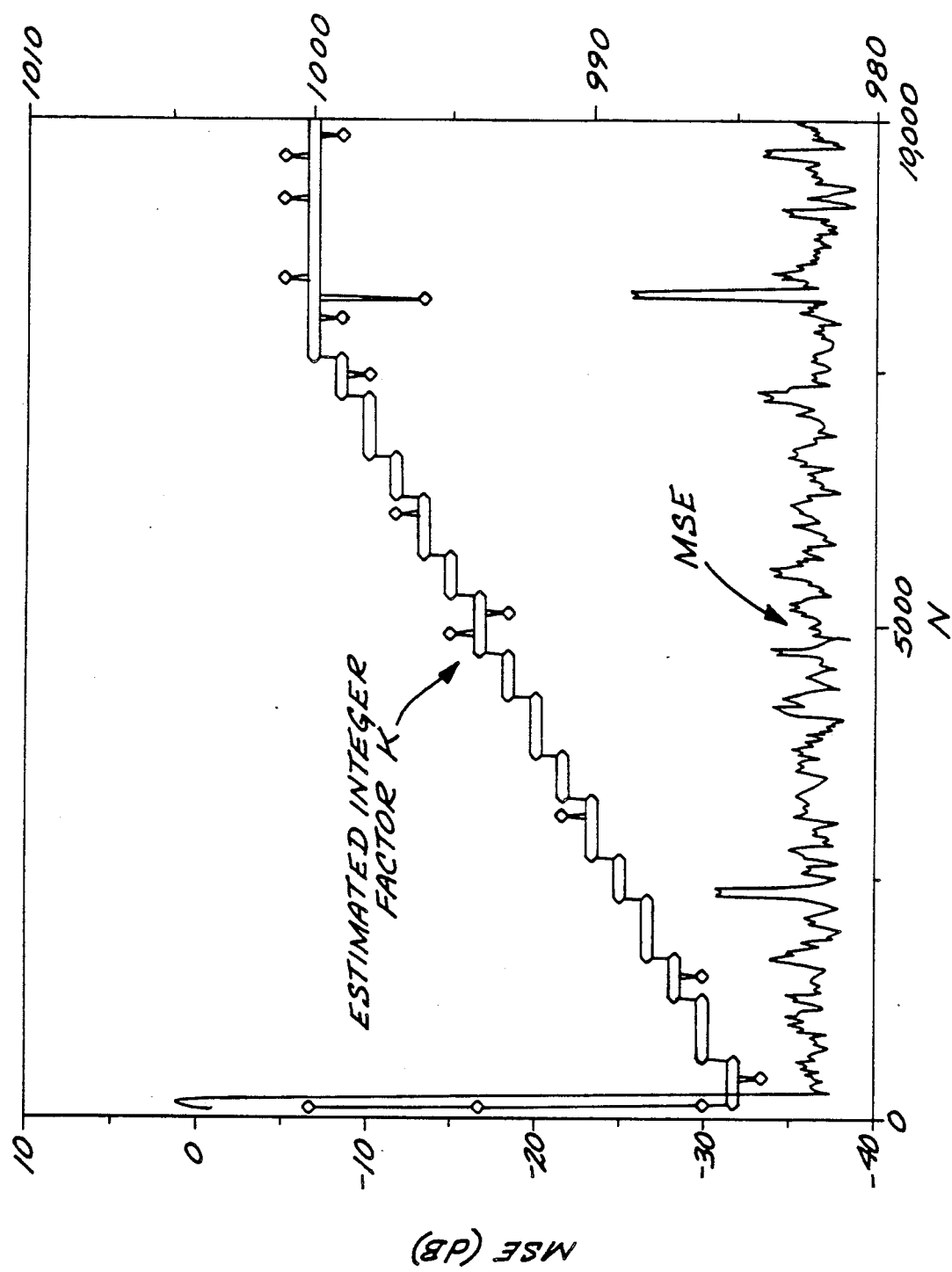
Figure 7A:
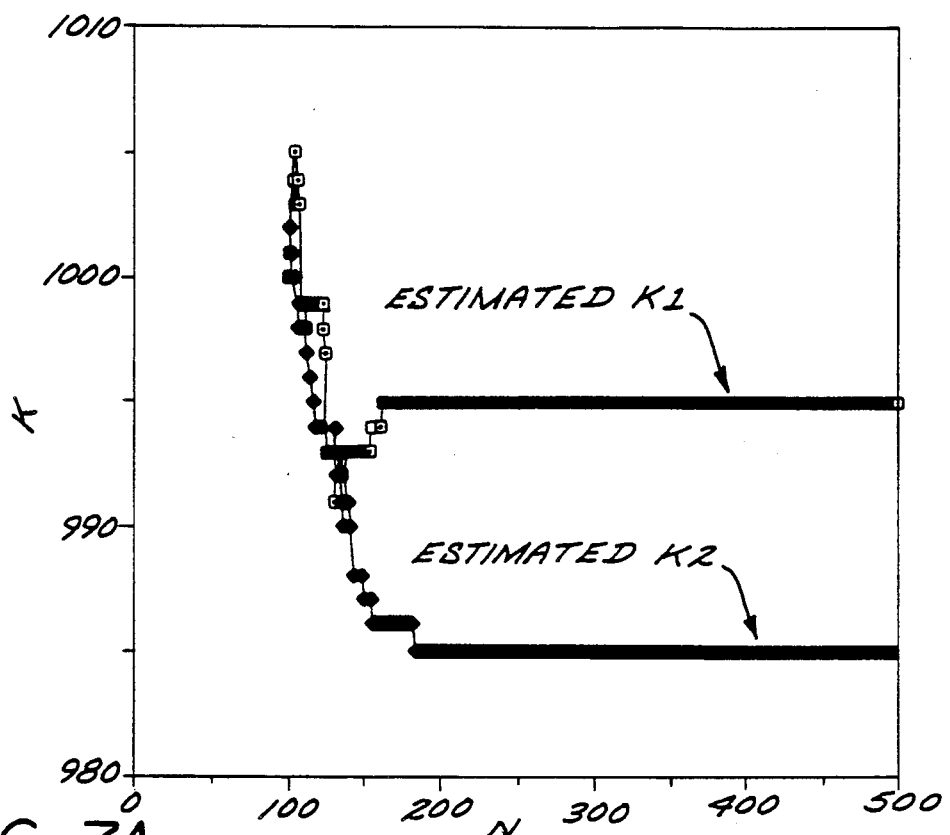
Figure 7B:
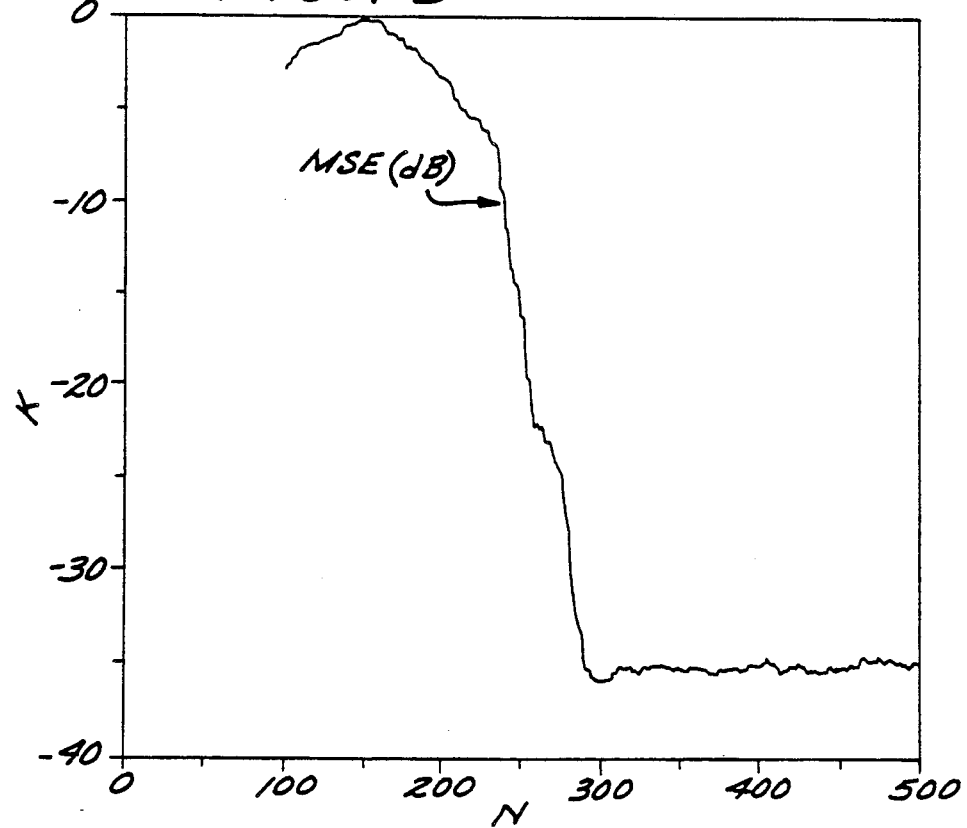

The remaining examples of FIGS. 5–7 are broadband cases. For each of these cases, there is a lag in the computing of the MSE while a buffer fills up to average the output power. In the broadband cases, the two channels, reference and primary, both have the same input power. Example 2 (FIG. 5) has a single broadband source with a shift that corresponds to a value of K=988. Again the correct value of K is quickly achieved, and the error is only between 2 and 3 dB above the noise floor Since dynamic tracking is a typical application for such a filter, Example 3 shown in FIG. 6 demonstrates a moving case where the Doppler shift parameter is varied to step from 985 to 1000 in steps every 500 samples. The algorithm update has a 1/n term which slows the tracking down as the number of samples gets large, unless the value of n is periodically reinitialized. In this example the value of n is reset to unity every 200 samples As can be seen, the value of K tracks the dynamics, and the MSE stays near the noise floor, with only occasional short impulses at the reset times.

Example 4 (FIGS. 7A–7B) shows the performance with a multiple input case. There are two waveforms with different Doppler shifts arriving from different directions. Therefore, a beam can be steered to each interferer while rejecting the other interferer via the beam's sidelobe response. There are, therefore, two adaptive Doppler filters, each working on a reference that steers a beam to one of the two interferers to be cancelled. Thus, each filter is trying to remove a Doppler shifted version of its component from the primary waveform The two values of K are 995 and 985. It can be seen that the two filters reach the correct values and the MSE is again reduced close to the uncorrelated noise floor. For any such multiple input case, there is a need to obtain "clean" references that have the individual un-Doppler-shifted interferences alone. They cannot be combined on both references as in conventional adaptive cancellation.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for adaptively cancelling a near field source of interference from a primary waveform that is masking a weaker target, wherein the interference source is moving in a medium between first and second spatially separated sensors which provide respective first and second observation signals, comprising a sequence of the following steps:

sampling the first and second observation signal waveforms at a sample rate 1/T to provide successive samples of the first and second observation signals;

interpolating the respective sampled first and second observation signals by an integer factor L to create the effect of a higher sample rate (1/LT);

decimating the interpolated samples of the second observation signal by an integer factor K to produce a sequence of samples at uniformly spaced times, the spacing at (1−V/c)KT/L, where V is the relative velocity between the interference source and the first sensor and c is the speed of signal propagation in the medium;

subtracting the interpolated, decimated samples of the second observation signal from the interpolated samples of the first sensor signal to provide an error signal; and adaptively varying the decimation factor K to minimize the power in the error signal.

2. The method of claim 1 wherein said step of adaptively varying K comprises the step of providing an estimate K(n) of the value for K, and updating the estimate with a scaled estimate of the gradient of the mean squared error signal.

3. The method of claim 2 wherein said estimate K(n) is updated in accordance the relationship $$K(n+1) = K(n) - \mu(1/n)\nabla_{nK(n)}\{E[e^2(nK)]\}$$

where $\mu$ = the step size scale factor, and $\nabla_{nk(n)}$ = the gradient of the error with respect to the decimation parameter.

4. The method of claim 2 wherein the first observation signal is x(t) and the second observation signal is $x[(1-a)t]$, and wherein said estimate is updated in accordance with the relationship $$K(n+1) = K(n) + \mu(1/n)(2/L)\{x(nT) - Z[nK(n)T]\}\{Z[nK(n) + L)T] - Z[(nK(n) - L)t]\}$$

where $Z[nK(n)T] = x[(1-a)(T/L)nK(n)]$.

5. The method of claim 1 further comprising the step of estimating the relative Doppler shift between the respective observation signals received at the first and second sensors, wherein the first observation signal is x(t) and the second observation signal is $x[(1-a)t]$, where "a" represents said relative Doppler shift, and $K_{PMIN}$ represents the value of K which minimizes the power in the error signal, and the relative Doppler shift a is estimated in accordance with the following relationship $$a = 1 - L/K_{PMIN}.$$

6. The method of claim 1 further comprising the step of estimating the relative velocity V of the interference source in dependence on the value of K, $K_{PMIN}$, which minimizes the power in the error signal.

7. The method of claim 6 wherein the velocity estimates $V_{est}$ are determined in accordance with the relationship $$V_{est} = (1 - L/K_{PMIN})/c.$$

8. An apparatus for adaptively cancelling a near field source of interference from a primary waveform that is masking a weaker target, wherein the interference source is moving in a medium between first and second spatially separated sensors which provide respective first and second observation signals, comprising:

means for sampling the first and second observation signal waveforms at a sample rate 1/T to provide successive samples of the first and second observation signals;

means for interpolating the respective sampled first and second observation signals by an integer factor L to create the effect of a higher sample rate (1LT);

means for decimating the interpolated samples of the second observation signal by an integer factor K to produce a sequence of samples at uniformly spaced times, the spacing at $(1-V/c)KT/L$, where V is the relative velocity between the interference source and the first sensor and c is the speed of signal propagation in the medium;

means for subtracting the interpolated, decimated samples of the second observation signal from the interpolated samples of the first observation signal to provide an error signal; and means for adaptively varying the decimation factor K to minimize the power in the error signal.

9. The apparatus of claim 8 wherein said means for adaptively varying K comprises means for providing an estimate K(n) of the value for K, and means for updating the estimate with a scaled estimate of the gradient of the mean squared error signal.

10. The apparatus of claim 9 wherein said estimate K(n) is updated in accordance the relationship $$K(n+1) = K(n) - \mu(1/n)\nabla_{nK(n)}\{E[e^2(n)]\}$$

where $\mu$ = a step size scale factor, $\nabla_{nk(n)}$ = the gradient of the error with respect to the decimation factor.

11. The apparatus of claim 9 wherein the first observation signal is x(t) and the second observation signal is $x[(1-a)t]$, and wherein said estimate is updated in accordance with the relationship $$K(n+1) = K(n) + \mu(1/n)(2/L)\{x(nT) - Z[nK(n)T]\}\{Z[nK(n) + L)T] - Z[(nK(n) - L)t]\}$$

where $Z[nK(n)T] = x[(1-a)(T/L)nK(n)]$.

12. The apparatus of claim 8 further comprising means for estimating the relative Doppler shift between the respective observation signals received at the first and second sensors, wherein the first observation signal is x(t) and the second observation signal is $x[(1-a)t]$, where "a" represents said relative Doppler shift, and represents the value of K which minimizes the power in the error signal, and the relative Doppler shift is estimated in accordance with the following relationship $$a = 1 - L/K_{PMIN}$$

13. The apparatus of claim 8 further comprising means for estimating the velocity of the interference source in dependence on the value of K, $K_{PMIN}$, which minimizes the power in the error signal.

14. The apparatus of claim 13 wherein the velocity estimates $V_{est}$ is determined in accordance with the relationship $$V_{est} = (1 - L/K_{PMIN})/c.$$

15. A method for estimating the relative Doppler shift on signals observed from a source moving in a medium in relation to first and second spatially separated sensors which provide respective first and second observation signals, comprising a sequence of the following steps:

sampling the first and second observation signal waveforms at a sample rate 1/T to provide successive samples of the first and second observation signals;

interpolating the respective sampled first and second observation signals by an integer factor L to create the effect of a higher sample rate (1/LT);

decimating the interpolated samples of the second observation signal by an integer factor K to produce a sequence of samples at uniformly spaced times, the spacing at $(1-V/c)KT/L$, where V is the relative velocity between the interference source and the first sensor and c is the speed of sound in the media;

subtracting the interpolated, decimated samples of the second observation signal from the interpolated samples of the first sensor signal to provide an error signal;

adaptively varying the decimation factor K to minimize the power in the error signal; and estimating the relative Doppler shift between the first and second observation signals in dependence on the value of K which minimizes the power in the error signal.

16. The method of claim 15 wherein said step of adaptively varying K comprises the step of providing an estimate K(n) of the value for K, and updating the estimate with a scaled estimate of the gradient of the mean squared error signal.

17. The method of claim 16 wherein said estimate K(n) is updated in accordance the relationship $$K(n+1)=K(n)-\mu(1/n)\nabla_{nK(n)}\{E[e^2(n)]\}$$

where $\mu=$ the step size scale factor, and $\nabla_{nk(n)}=$ the gradient of the error with respect to the decimation parameter.

18. The method of claim 16 wherein the first observation signal is x(t) and the second observation signal is $x[(1-a)t]$, and wherein said estimate is updated in accordance with the relationship $$K(n+1) = K(n) + \mu(1/n)(2/L)\{x(nT) - Z[nK(n)T]\}\{Z[nK(n) + L)T] - Z[(nK(n) - L)t]\}$$

where $Z[nK(n)T]=x[(1-a)(T/L)nK(n)]$.

19. The method of claim 15 wherein the first observation signal is x(t) and the second observation signal is $x[(1-a)t]$, where "a" represents said relative Doppler shift, and $K_{PMIN}$ represents the value of K which minimizes the power in the error signal, and the relative Doppler shift is estimated in accordance with the following relationship $$a=1-L/K_{PMIN}.$$

20. The method of claim 15 further comprising the step of estimating the relative velocity V of the interference source in dependence on the value of K, $K_{PMIN}$, which minimizes the power in the error signal.

21. The method of claim 20 wherein the relative velocity estimates $V_{est}$ are determined in accordance with the relationship $$V_{est}=(1-L/K_{PMIN})/c.$$

22. An apparatus for estimating the relative Doppler shift on signals observed from a source moving in a medium in relation to first and second spatially separated sensors which provide respective first and second observation signals, comprising:

means for sampling the first and second observation signal waveforms at a sample rate 1/T to provide successive samples of the first and second observation signals;

means for interpolating the respective sampled first and second observation signals by an integer factor L to create the effect of a higher sample rate the second observation signal by an integer factor K to produce a sequence of samples at uniformly spaced times, the spacing at $(1-V/c)KT/L$, where V is the relative velocity between the interference source and the first sensor and c is the speed of signal propagation;

means for subtracting the interpolated, decimated samples of the second observation signal from the interpolated samples of the first observation signal to provide an error signal;

means for adaptively varying the decimation factor K to minimize the power in the error signal; and estimating the relative Doppler shift between the first and second observation signals in dependence on the value of K which minimizes the power in the error signal.

23. The apparatus of claim 22 wherein said means for adaptively varying K comprises means for providing an estimate K(n) of the value for K, and means for updating the estimate with a scaled estimate of the gradient of the mean squared error signal.

24. The apparatus of claim 23 wherein said estimate K(n) is updated in accordance the relationship $$K(n+1)=K(n)-\mu(1/n)\nabla_{nK(n)}\{E[e^2(n)]\}$$

where $\mu=$ a step size scale factor, $\nabla_{nk(n)}=$ the gradient of the error with respect to the decimation factor.

25. The apparatus of claim 24 wherein the first observation signal is x(t) and the second observation signal is $x[(1-a)t]$, and wherein said estimate is updated in accordance with the relationship $$K(n + 1) = K(n) + \mu(1/n)(2/L)\{x(nT) - Z[nK(n)T]\}\{Z[nK(n) + L)T] - Z[(nK(n) - L)t]\}$$

where $Z[nK(n)T]=x[(1-a)(T/L)nK(n)]$.

26. The method of claim 22 wherein the first observation signal is x(t) and the second observation signal is $x[(1-a)t]$, where "a" represents said relative Doppler and $K_{PMIN}$ represents the value of K which minimizes the power in the error signal, and the relative Doppler shift is estimated in accordance with the following relationship $$a=1-L/K_{PMIN}.$$

27. The apparatus of claim 22 further comprising means for estimating the velocity of the interference source in dependence on the value of K, $K_{PMIN}$, which minimizes the power in the error signal.

28. The apparatus of claim 27 wherein the velocity estimates $V_{est}$ is determined in accordance with the relationship $$V_{est}=(1-L/K_{PMIN})/c.$$

* * * * *